Figure 1:
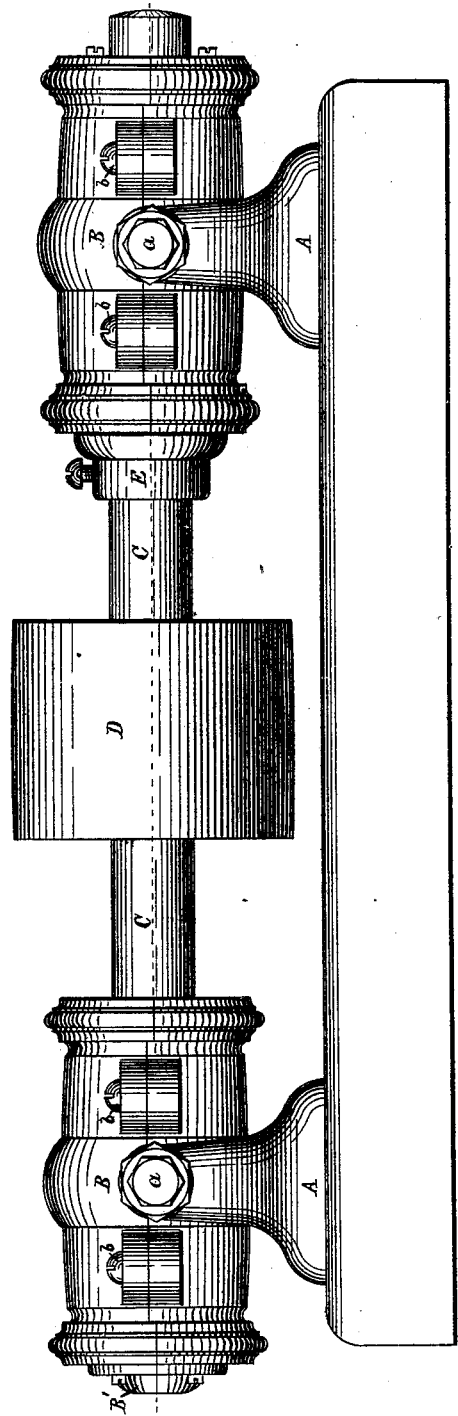

O. R. CHAPLIN.
ANTI-FRICTION BEARING FOR REVOLVING SHAFT-AXLES.

No. 189,427. Patented April 10, 1877.

WITNESSES
N. C. Lombard,
E. A. Hemmenway.

INVENTOR.
Orril R. Chaplin.

2 Sheets—Sheet 2.

O. R. CHAPLIN.
ANTI-FRICTION BEARING FOR REVOLVING SHAFT-AXLES.

No. 189,427.          Patented April 10, 1877.

WITNESSES
N. C. Lombard.
E. H. Hemmenway

INVENTOR.
Orril R. Chaplin

UNITED STATES PATENT OFFICE.

ORRIL R. CHAPLIN, OF BOSTON, MASSACHUSETTS.

IMPROVEMENT IN ANTI-FRICTION BEARINGS FOR REVOLVING SHAFT-AXLES.

Specification forming part of Letters Patent No. 189,427, dated April 10, 1877; application filed January 9, 1877.

*To all whom it may concern:*

Be it known that I, ORRIL R. CHAPLIN, of Boston, in the county of Suffolk and State of Massachusetts, have invented certain new and useful Improvements in Anti-Friction Bearings for Revolving Shafts, Axles, &c., of which the following, taken in connection with the accompanying drawings, is a specification:

My invention relates to that class of bearings in which the journal of a revolving shaft or axle rests upon a series of anti-friction rolls surrounding the same, and between it and the inclosing box or housing, and especially to the manner of mounting said anti-friction rolls, and the means employed to reduce the friction, which would otherwise be caused by the end thrust of the shaft; and it consists, first, in the use, in combination with the journal of a revolving shaft or axle, of a series of anti-friction rolls, surrounding said journal and between it and its inclosing-box or housing, each of said anti-friction rolls being provided at the center of its length with a short section of a reduced diameter; another series of short anti-friction rolls, in the form of straight cylinders, of a length about equal to the length of said short sections of reduced diameter of the first-mentioned series of rolls, and a diameter a little greater than the diameter of said reduced sections of the main or supporting rolls, said short rolls being arranged alternately with the main or supporting anti-friction rolls around the journal of the shaft or axle, and each of said short or separating rolls rolling in contact with the reduced sections of two of the long supporting-rolls, and serving to keep them a stated distance apart, and being held in position longitudinally by the shoulders formed on the supporting-rolls, by reducing their diameters in the center of their lengths.

My invention further consists in the use, in combination with the two series of anti-friction rolls, as above described, of two rings, arranged one within the other, and concentric with each other and the axis of the shaft or axle, the inner or smaller of said rings surrounding the journal of the shaft or axle in close proximity thereto, but not touching it, the outer periphery of said ring being so placed and of such diameter that the series of short separating-rolls will be in contact therewith, the outer or larger of said rings being of such an interior diameter as to just surround and inclose said separating-rolls, said rings being moved about the axis of the shaft in opposite directions by the rolling contact of the supporting-rolls, without touching the shaft or inclosing casing.

My invention further consists in making said outer ring in two semicircular parts jointed together for the purpose of facilitating the putting together and separating of the parts.

My invention further consists in forming the inclosing-box or housing in which the series of supporting-rolls and the shaft or axle revolve in such a manner that its interior shall consist of two cylindrical sections of equal diameter, separated by an annular groove or enlargement of the chamber within which the outer ring, inclosing the two series of anti-friction rolls, revolves without contact with the bottoms of said groove, when said box is cast in two parts, divided longitudinally, or parallel with the axis of the shaft, to form the box and cap as distinguished from a box made up of two or more annular rings secured together by bolts arranged parallel to the axis of the shaft.

My invention further consists in the formation, within the chamber of the inclosing-box, of two annular ribs, cast in one piece with the box, and projecting inward from the inner periphery of said box, and located one upon each side of the annular groove or enlargement in which the outer ring revolves, said ribs being in the form, as seen in cross-section, of a half V, somewhat flattened, in combination with two correspondingly-shaped grooves formed in each of the main supporting anti-friction rolls, one upon either side of the reduced journal, and adapted to engage with said ribs, to prevent endwise motion of said supporting-rolls.

Figure 2:
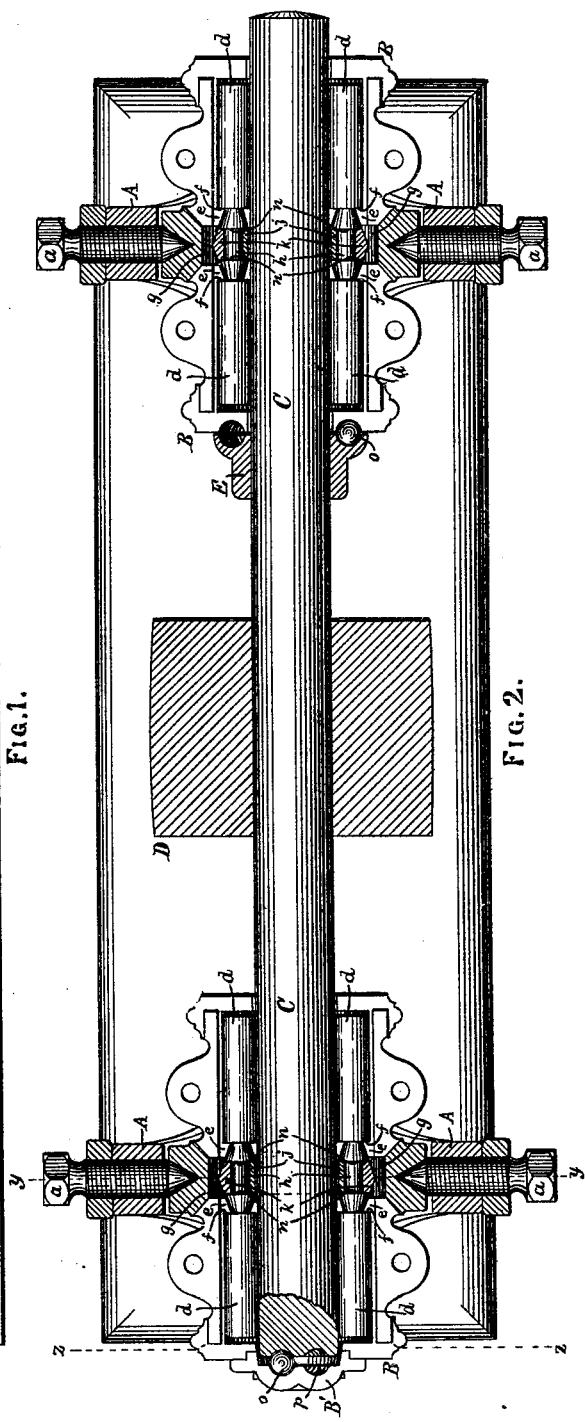
Figure 3:
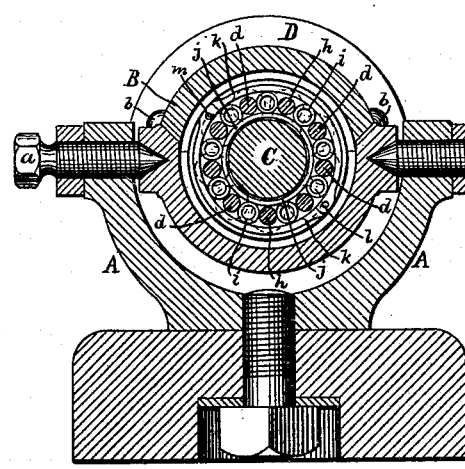
Figure 4:
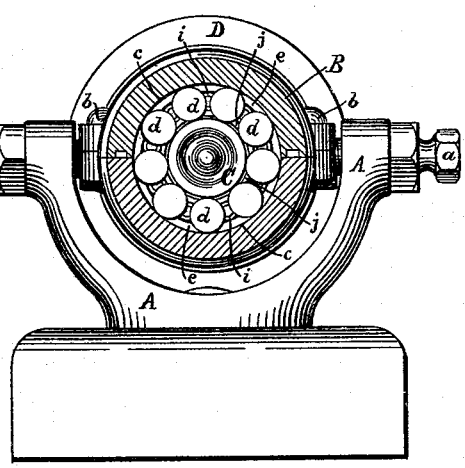
Figure 5:
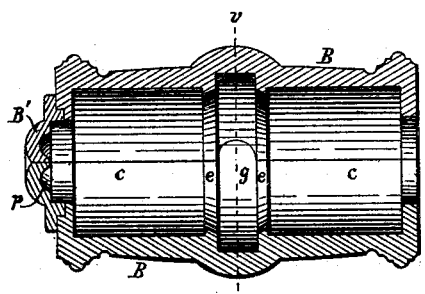
Figure 6:
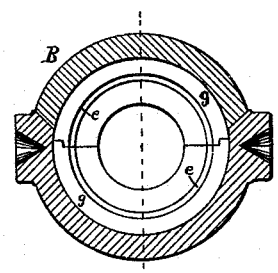
Figure 7:
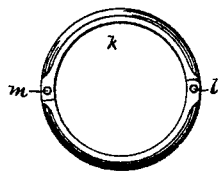
Figure 8:
Figure 9:
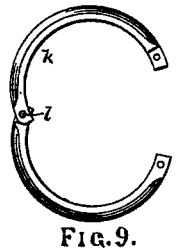
Figure 10:
Figure 11:
Figures 13, 14:
Figure 12:
Figure 15:

Figure 1 is a side elevation of a shaft and a pair of bearings representing my invention. Fig. 2 is a horizontal section on line $x\,x$ on Fig. 1. Fig. 3 is a transverse section on line y y on Fig. 2. Fig. 4 is a transverse section on line z z on Fig. 2, and showing the ends of the shaft and supporting-rollers in elevation. Fig. 5 is a vertical longitudinal section of one of the box casings or housings, and Fig. 6 is a transverse section of the same on line v v. Figs. 7, 8, and 9 are details of the outer ring. Figs. 10 and 11 are, respectively, an elevation and an edge view of the inner ring. Fig. 12 is an elevation of one of the supporting antifriction rolls detached. Figs. 13 and 14 are, respectively, an end view and a side elevation of one of the separating anti-friction rolls; and Fig. 15 is a detached view of the ball which takes the end thrust of the shaft.

A A are the hangers or stands in which the boxes B B are supported upon the adjustable centers $a\ a$, all in a well-known manner.

The boxes B B are made in two parts divided longitudinally, and secured together by screws or bolts $b\ b$, also in a well-known manner.

The interiors of the boxes B B are formed as shown in Fig. 5, in which the two cylindrical chambers or surfaces $c\ c$ are the bearing-surface upon which the supporting-rolls $d\ d$ rest. $e\ e$ are annular ribs cast with, and forming a part of, the box and its cap, and projecting inward from the inner surface thereof, against the sides of which that are perpendicular to the cylinders $c\ c$, the shoulders $f\ f$ on the supporting-rolls $d\ d$ strike, in case of any tendency of said rolls to move endwise, and $g$ is an annular groove or enlargement located between the two ribs $e\ e$, the purpose of which will appear hereafter.

C is a shaft provided with the pulley D, by means of which rotary motion may be imparted thereto.

This shaft rests upon, and rotates in contact with, a series of anti-friction rolls, $d\ d$, arranged equidistant from each other around said shaft, and in contact with the cylindrical surfaces $c\ c$ of the boxes B B.

The rolls $d\ d$ are provided with two shoulders, $f\ f$, and a short section, $h$, cylindrical in form, but of considerably smaller diameter than the main portion of the rolls, as shown in Fig. 12.

Between each two of the rolls $d\ d$ is placed a short cylindrical roll, $i$, of a length just equal to the length of the reduced section $h$ of the rolls $d\ d$ and a diameter a little greater than said reduced sections, and adapted to bear along the whole of its length upon and roll in contact with said reduced sections, and with the outer circumference of the ring $j$ and the inner periphery of the ring $k$, while the reduced sections $h$ of the rolls $d\ d$ do not touch either ring.

The inner ring $j$ surrounds the shaft C without touching it, the rolls $i$ rest against its outer surface and just fill the space between two contiguous journals, $h$, of the rolls $d\ d$, and the ring $k$ surrounds and incloses the whole, said ring being made of suitable diameter to bear upon all of the rolls $i\ i$ without touching the bottom of the groove $g$ or any other part of the box or housing B.

The ring $k$ is made in two semicircular parts hinged together at $l$, so that it can be opened, as shown in Fig. 9, to place it around the cluster of rolls when the other joint is secured by inserting the pin $m$ through the tongued and grooved ends, as shown in Figs. 7 and 8.

The rings $j$ and $k$ are kept in place relative to the two ends of the rolls $d\ d$ by the shoulders $n\ n$, formed in said rolls, by making the reduced journals $h$ as shown in Fig. 2, and move about the axis of the shaft in opposite directions as they are acted upon by the rolls $i\ i$.

The rolls $d\ d$ are made somewhat shorter than the whole length of the interior of the box B, so that their ends cannot come in contact with the ends of the box, but the tendency of the rolls $d\ d$ to move endwise will be counteracted by the shoulders $f\ f$ coming in contact with the ribs $e\ e$.

E is a collar secured firmly upon the shaft C, in close proximity to the end of one of the boxes B, and having formed in its inner face an annular groove, semicircular or nearly so, in cross-section, and of a diameter exactly corresponding to the diameter of a similar groove formed in the contiguous end of the box B, in which groove is placed the ball $o$, to take the endwise thrust of the shaft C, as shown at the right of Fig. 2. This plan is used only when for any reason it is not convenient to use the plan represented at the left of Fig. 2, where the end of the box is closed up by the cap B', in the inner face of which is formed the annular semicircular groove $p$, corresponding to a similar groove formed in the end of the shaft, in which is placed the ball $o$.

This latter arrangement is preferred when it can be used, for the reason that the ball rolls in a much smaller circle, and therefore makes less revolutions, and consequently is subjected to less wear, and what little friction there is, if any, presents less resistance to the revolution of the shaft.

By this arrangement of the parts I have done away almost entirely with rubbing or slipping action of the surfaces, substituting therefor rolling surfaces, and by so doing I have produced a bearing in which, when properly constructed, a shaft may be revolved at a high rate of speed for an almost indefinite period, without oil or other lubricant, and with little or no wear.

What I claim as new, and desire to secure by Letters Patent of the United States, is as follows:

1. The combination of the shaft C, box B, a series of rolls, $d$, provided with the centrally-located reduced journals $h$, and adapted to roll in contact with the shaft and the inclosing-box, a second series of short rolls or cylinders, $i\ i$, adapted to bear along their whole length upon said reduced journals $h$, and the two rings $j\ k$ adapted to be revolved in opposite directions by contact with opposite sides of the rolls $i\ i$, substantially as and for the purposes described.

2. In combination with the two series of rolls $d$ and $i$, and the ring $j$, constructed and arranged as set forth, the ring $k$, made in two semicircular parts, hinged together at one side, and secured together at the other side, by a pin, as and for the purposes described.

3. The box B, made in two parts, divided longitudinally, and having formed in its interior two cylindrical surfaces, $c\ c$, of equal diameter, separated by an annular groove or enlarged chamber, $g$, in combination with the supporting-rolls $d\ d$, separating-rolls $i\ i$, and the rings $j\ k$, adapted to revolve in opposite directions in the same plane, substantially as and for the purposes described.

4. The combination, in a box or journal-bearing, made in two parts, divided longitudinally, of two interior cylindrical surfaces of equal diameter, separated by an annular groove or enlarged chamber, $g$, and two inwardly-projecting annular ribs, $e\ e$, cast with or forming an integral part of said box and its cap, substantially as described.

Executed at Boston this 2d day of January, 1877.

ORRIL R. CHAPLIN.

Witnesses:
 N. C. LOMBARD,
 E. A. HEMMENWAY.